United States Patent
Kuhnle

[11] 3,712,156
[45] Jan. 23, 1973

[54] CONTROL MECHANISM FOR FLUID-OPERATED VEHICULAR TRANSMISSION SYSTEM

[75] Inventor: Willi Kuhnle, 7990 Friedrichshafen, Germany

[73] Assignee: Zahnradfabrik Friedrichshafen Aktiengesellschaft, Friedrichshafen, Germany

[22] Filed: March 11, 1971

[21] Appl. No.: 123,185

[52] U.S. Cl. ..................................... 74/858, 74/872
[51] Int. Cl. ............................................. B60k 21/02
[58] Field of Search .......................... 74/858, 872

[56] References Cited

UNITED STATES PATENTS

| | | | |
|---|---|---|---|
| 2,103,540 | 12/1937 | Livemore | 74/858 |
| 2,322,479 | 6/1943 | Schjolin | 74/858 X |
| 2,447,730 | 8/1948 | Britton | 74/858 |
| 2,459,093 | 1/1949 | Peterson et al. | 74/858 X |
| 2,594,811 | 4/1952 | Schjolin | 74/858 X |
| 2,673,474 | 3/1954 | Boyce | 74/858 |

Primary Examiner—Milton Kaufman
Assistant Examiner—Thomas C. Perry
Attorney—Karl F. Ross

[57] ABSTRACT

Upon the engagement of a hydraulic clutch or brake to shift gears in a vehicular transmission system, the change in hydraulic pressure is utilized to trip a timer for the temporary reduction of engine power during the shifting process.

5 Claims, 1 Drawing Figure

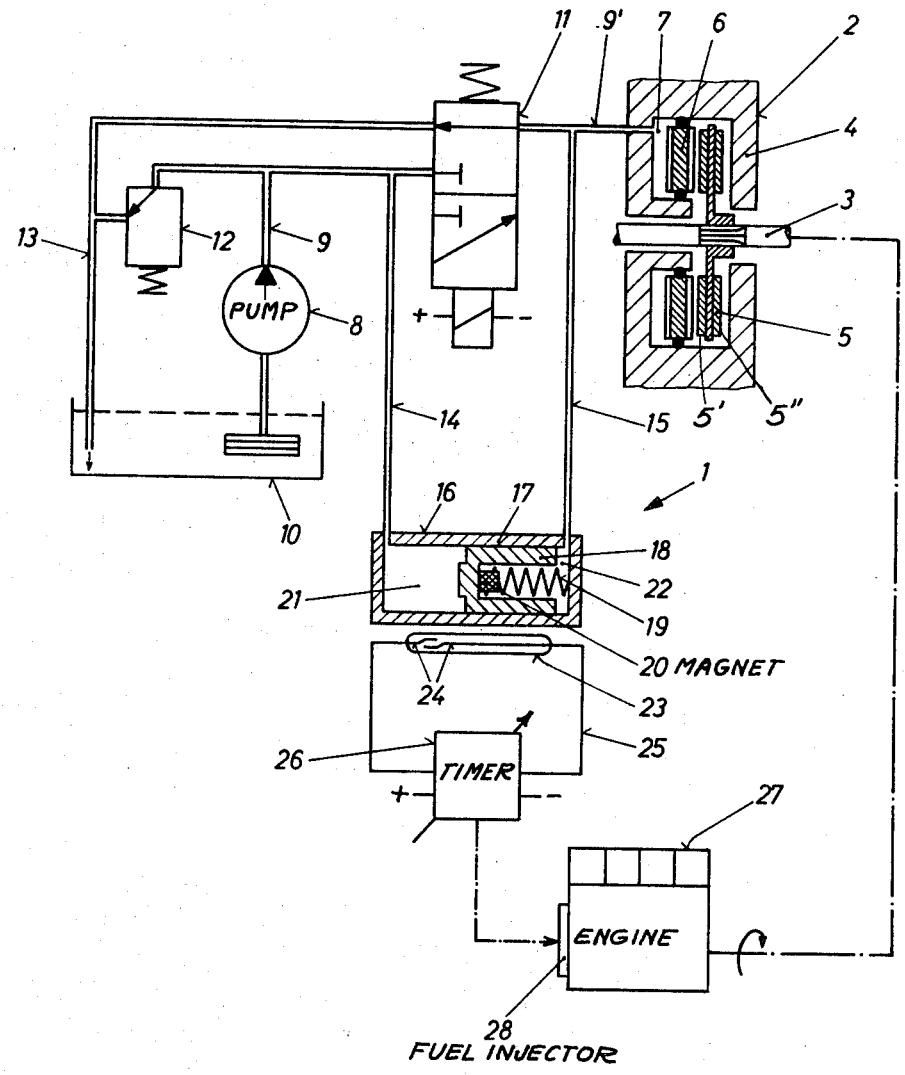

CONTROL MECHANISM FOR FLUID-OPERATED VEHICULAR TRANSMISSION SYSTEM

My present invention relates to a control mechanism for a vehicular transmission system of the fluid-operated type, e.g. as described in commonly owned U.S. Pat. No. 3,559,669.

Such a transmission system includes drive-establishing means in the form of fluid-actuatable brakes and clutches which, by their operation, serve to shift from one speed ratio to another by the selective arresting or entraining of various shafts. This gear-shifting process generally takes place with a vehicle in motion and, with the engine under load, both the engagement and the disengagement must be gradual in order to maintain the necessary continuity of the drive and to prevent harmful shocks in the power train.

If the clutch or brake is to engage a shaft driven at high speed, considerable heat may be developed and, unless quickly dissipated, may damage the friction linings thereof. This problem applies particularly to relatively compact constructions with small clutch and brake housings.

The object of my invention, therefore, is to provide means in such a transmission for temporarily diminishing, during gear shifting, the torque applied by the engine to a shaft to be engaged by a fluid-actuated clutch or brake.

This object is realized, in accordance with my invention, by the provision of a sensor which responds to variation in fluid pressure upon engagement of an associated drive-establishing means (clutch or brake) and is coupled to a torque-control mechanism for temporarily reducing the engine power at the inception of engagement thereof with an engine-driven shaft.

More specifically, the pressure sensor may be connected across a valve in a conduit leading to a port in the housing of the associated clutch or brake, the varying pressure differential across this valve serving to displace a piston in a cylinder which controls, preferably magnetically, a switch contact to trip a timer measuring an operating interval for the torque-control mechanism. This mechanism advantageously includes a fuel injector for the vehicular engine which, during the interval established by the timer, throttles the rate of fuel injection into the several engine cylinders; such a timer-controlled fuel injector has been disclosed, for example, in U.S. Pat. No. 2,863,437. The timer may be adjustable, e.g. in response to a manual selector, to vary the length of the operating interval or to eliminate it completely under certain conditions; in the case of a brake used for both high-speed forward drive and reverse (see the aforementioned prior U.S. Pat. No. 3,559,669), for example, the torque reduction may not be required for shifting into reverse gear.

The control mechanism according to my invention is simple in its construction and fully automatic in its operation. The temporary throttling of engine power does not interrupt the power train from the engine to the traction wheels of the vehicle so that the shifting occurs smoothly.

The invention will be described in greater detail hereinafter with reference to the accompanying drawing the sole FIGURE of which diagrammatically illustrates a representative embodiment.

In the drawing I have shown at 2 a drive-establishing element, here a hydraulic brake, which co-operates with a shaft 3 forming part of a power train driven from an internal-combustion engine 27, e.g. of the four-cylinder type. Brake 2 has a housing 4 in which a flexible disk 5, carrying friction linings 5' and 5", is rotatable together with the shaft 3 to which it is keyed. A piston member 6 in housing 4 is axially displaceable toward the disk 5 to press it against the opposite housing wall, thereby immobilizing the shaft 3. A port 7 in the wall of brake housing 4 is joined to a conduit 9' which is selectively connectable, via an electromagnetically shiftable valve 11, to a low-pressure conduit 13 or a high-pressure conduit 9. Conduit 13 discharges into a reservoir 10 of hydraulic fluid which is continuously recirculated by a pump 8 through the high-pressure conduit 9 and a threshold valve 12.

Engine 27 has a fuel injector 28 whose delivery rate is adjustable in the usual manner by a connection to an accelerator pedal, not shown, and can also be varied (e.g. diminished) by an electrical signal from a timer 26. A control circuit for this timer, generally designated 1, includes a pressure switch 16 consisting essentially of a cylinder 17 and a piston 18 which is axially displaceable therein. Piston 18 divides the interior of cylinder 17 into a first compartment 21, with a fluid inlet connected via a branch line 14 to conduit 9, and into a second compartment 22, with a fluid inlet connected via a branch line 15 to conduit 9'. A biasing spring 19 urges the piston 18 toward the left, i.e. in the direction of compartment 21, but the piston is maintained in its illustrated right-hand position by the pressure differential existing across valve 11 when this valve is in its disengagement position, i.e. when the interior of brake housing 4 is drained via conduit 13; the magnitude of this differential is determined by the threshold of valve 12.

Upon the displacement of valve 11 into its alternate position, the pressure differential across that valve gradually diminishes as the brake 2 acts upon the shaft 3 to arrest it. This reduction in pressure enables the spring 19 to advance the piston 18 toward the left whereby a permanent magnet 20, carried on that piston, moves into proximity of a pair of normally open contacts 24 of a signal generator in the form of a magnetic relay 23 disposed next to the pressure switch 16. Relay 23, upon the closure of its contacts, trips the timer 26 to initiate the throttling interval during which the fuel injector 28 reduces the power of the engine 27.

Upon the subsequent disengagement of the brake 2 by the return of shift valve 11 to its original position, the pressure differential prevailing between the switch inputs 14 and 15 is re-established so that piston 18 moves back to the right to recompress its biasing spring 19. This operation conditions the timer 26 for another cycle as just described.

It will be evident that the same mode of operation can be used if the brake 2 is replaced by a hydraulic clutch differing from that brake only by the interposition of another friction disk, keyed to a second shaft, between disk 5 and piston 6.

I claim:

1. In a vehicular transmission system including a fuel-operated engine, a power train coupled to said engine including a driven shaft, and fluid-actuatable drive-establishing means engageable with said shaft for shifting between different speed ratios, said drive-establishing means being provided with a port for an actuating fluid, a conduit terminating at said port and valve means in said conduit for selectively blocking and unblocking the flow of said fluid through said conduit, the combination therewith of a pressure-sensing switch having input connections to said conduit on opposite sides of said valve means for developing across said switch a pressure differential subject to variation upon engagement of said drive-establishing means with said shaft, said switch including signal-generating means responsive to a predetermined variation of said pressure differential indicative of incipient engagement, and torque-control means for said engine coupled to said signal-generating means for temporarily diminishing the engine power upon such incipient engagement while maintaining the continuity of said power train.

2. The combination defined in claim 1 wherein said switch includes a cylinder provided at opposite ends with fluid inlets constituting said input connections, a piston in said cylinder, biasing means urging said piston into one limiting position, and contact means operable by said piston upon displacement thereof into another limiting position against the force of said biasing means.

3. The combination defined in claim 2 wherein said torque-control means includes timing means controlled by said contacts for measuring a power-reduction interval for said engine means.

4. The combination defined in claim 2 wherein said contact means comprises a magnetic relay adjacent said cylinder, said piston being provided with a permanent magnet for operating said relay upon said displacement thereof into said other limiting position.

5. The combination defined in claim 3 wherein said torque-control means further comprises a fuel injector responsive to said timing means.

* * * * *